United States Patent [19]
Fenske

[11] Patent Number: 5,887,928
[45] Date of Patent: *Mar. 30, 1999

[54] SLAM LATCH FOR HORSE TRAILER

[75] Inventor: Donald J. Fenske, Cresco, Iowa

[73] Assignee: Featherlite Mfg., Inc., Cresco, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 948,214

[22] Filed: Oct. 9, 1997

Related U.S. Application Data

[63] Continuation of Ser. No. 554,784, Nov. 7, 1995, abandoned.

[51] Int. Cl.$^6$ ........................................................... B60P 3/05
[52] U.S. Cl. ........................ 296/24.2; 119/412; 292/259 A
[58] Field of Search ........................ 296/24.2, 50, 146.9; 119/412; 292/32–34, 96, 259 A, 266

[56] References Cited

U.S. PATENT DOCUMENTS 5,174,240  12/1992  Darvill ................................. 292/24.2
5,513,595   5/1996  Chatterton ............................. 296/24.2

Primary Examiner—Jesus D. Sotelo
Attorney, Agent, or Firm—Merchant, Gould, Smith, Edell, Welter & Schmidt, P.A.

[57] ABSTRACT

A slam latch is provided which includes a housing which receives a planar slide which is movable between an extended position and a retracted position. A spring biases the slide toward the extended position. The housing forms a part of a divider which is hingedly mounted to a trailer body to form compartments in the trailer. Preferably, the housing is made of metal, and the slide is made of plastic. The housing has a hole in each side of the housing allowing access to the slide. Preferably, the slide includes a hole therethrough defining a hand slot. The trailer body includes a receiver post which receives the end of the slide in the extended position to latch the divider in place. Preferably, the receiver post has a continuous cross-section from floor to ceiling and is flush with the wall of the trailer body.

17 Claims, 4 Drawing Sheets

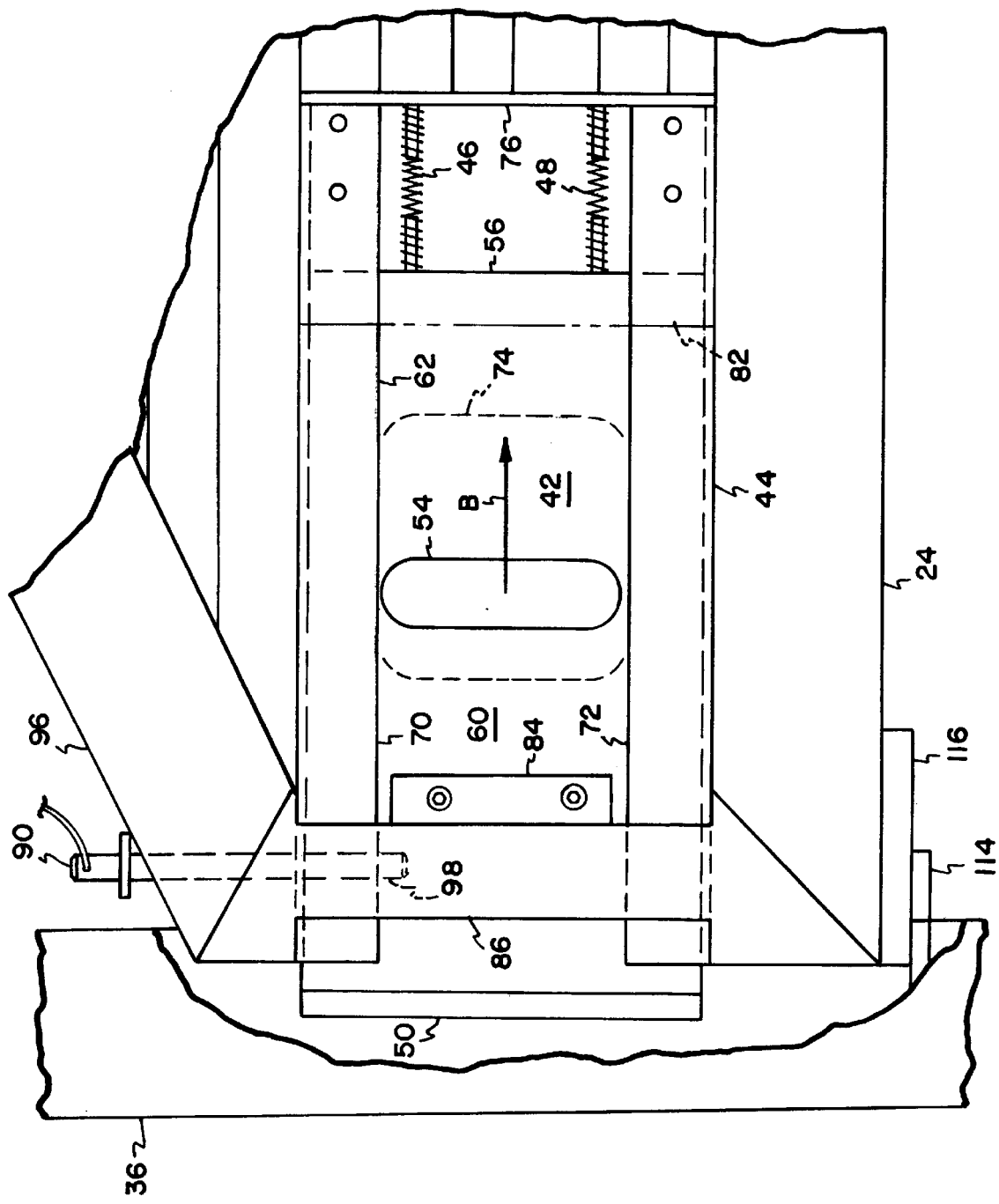

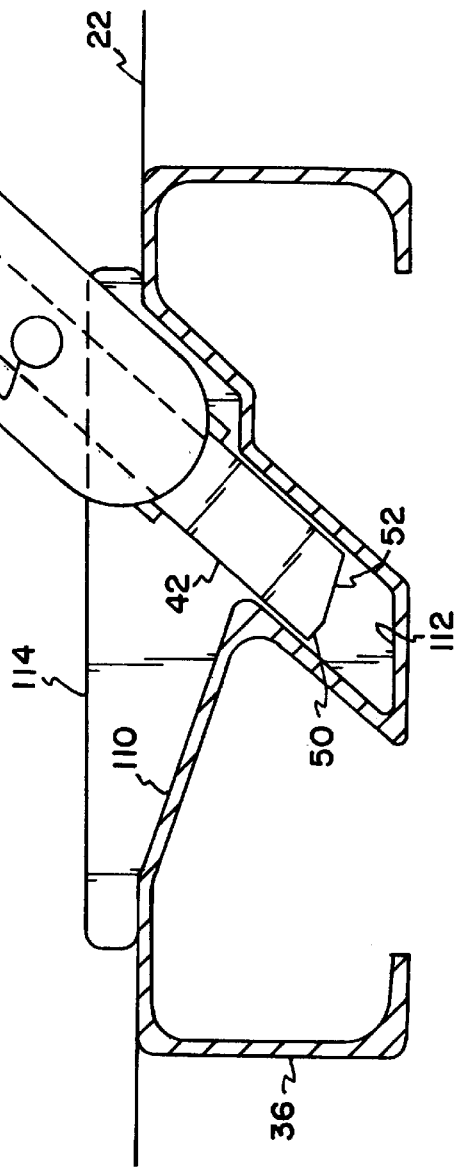
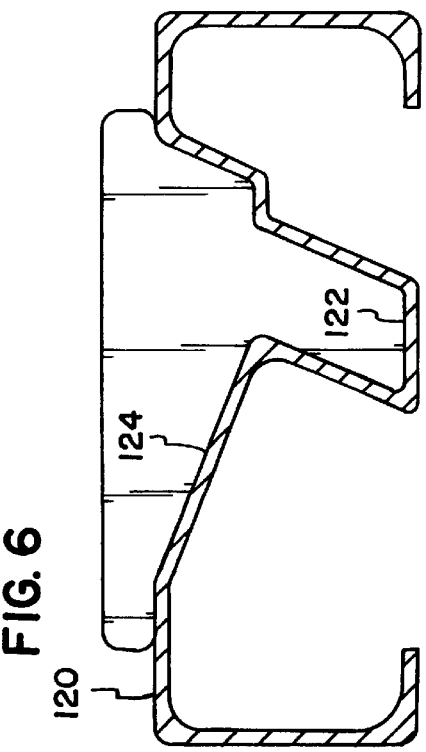

SLAM LATCH FOR HORSE TRAILER

This is a Continuation of application Ser. No. 08/554,784, filed Nov. 7,1995, now abandoned.

FIELD OF THE INVENTION

The present invention relates generally to automatic latches, and more particularly to slam latches for dividers in horse trailers.

BACKGROUND OF THE INVENTION

Latches are useful for temporarily closing doors, moveable walls and space dividers. Horse trailers include one or more hinged dividers for use in creating temporary compartments in the horse trailers for the horse or horses in each trailer and for equipment. The divider keeps the horse contained in a defined compartment within the trailer. Slam latches are known for use in latching the dividers in the closed position in the horse trailer.

Various concerns arise in the case of automatic latches, particularly in the case of slam latches used for dividers in horse trailers. It is desirable that the latches be easy and cost effective to manufacture and easy to use. Also, it is desirable that the latches be reliable, durable and not require excessive maintenance. In the particular case of the slam latches for horse trailers, trailer owners and horse attendants are concerned that the latches not come loose from vibrations or bumps during travel, or if the horse bumps into the divider or the latch. If the divider unintentionally moves, the horse may be unsafely contained in the trailer. There is also a concern that the slam latches not harm or catch on the horses that happen to contact the latches. Also, it is a concern that the slam latches not catch on a person in the trailer walking by the latches. There is a need in the art for slam latches that address the above concerns and other concerns.

SUMMARY OF THE INVENTION

The present invention is a slam latch including a housing with an interior which contains a planar slide. The planar slide has an opening through the slide defining a hand slot. The housing has an access hole on each side which allows access to the hand slot of the slide. The slam latch includes a spring which biases the slide toward an extended or latched position.

The housing is preferably part of a divider hingedly mounted in an interior of a trailer body. A receiver in an opposite wall receives the end of the slide in the latched position. Preferably, the receiver is a post of continuous cross-section defining a ramp surface and a recess extending from the floor to the ceiling of the trailer. A support surface mounted to the post supports a lower edge of the divider. In a preferred construction, the slide is made from plastic, such as polyethylene, and the housing is made from metal, such as aluminum.

The slam latch includes a safety lock operable between a locked position and an unlocked position. Preferably, the safety lock includes a pin which fits into a hole through the housing and a recess in the slide.

BRIEF DESCRIPTION OF THE FIGURES

FIG. 3 is a further enlarged side view of the slam latch of FIG. 2 with the cover plate shown in phantom.

FIG. 4 is a top view of a portion of the divider, slam latch, and receiver post shown in FIG. 3, with the receiver post shown in cross-section.

FIG. 6 is a cross-sectional top view of an alternative receiver post to the receiver post illustrated in FIG. 4 for an alternative horse trailer.

DETAILED DESCRIPTION OF THE PREFERRED EMBODIMENTS

Figure 1:
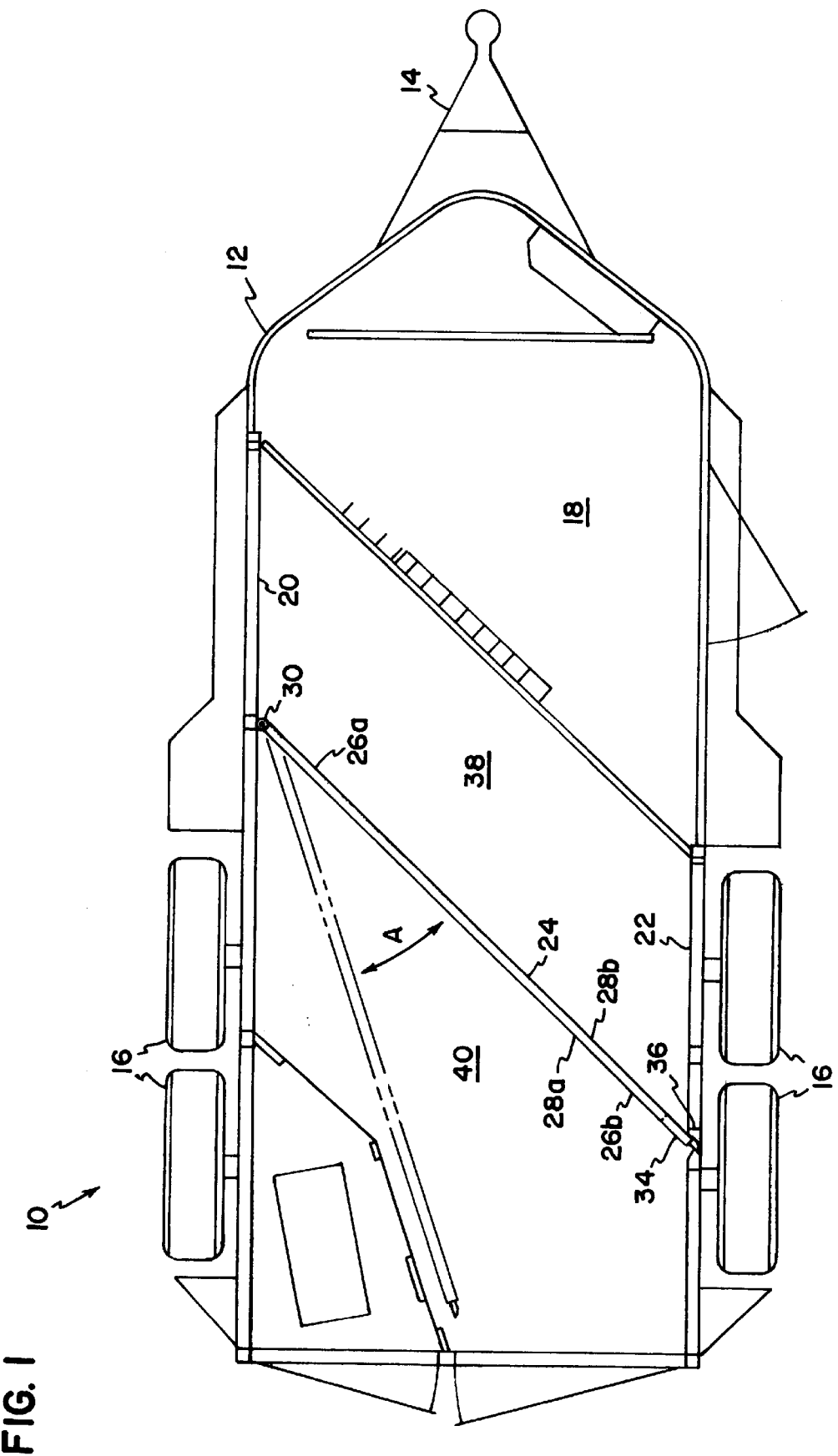
FIG. 1 is a top view of a horse trailer showing a divider temporarily held in the closed position by a preferred embodiment of a slam latch according to the present invention.

Referring now to FIG. 1, a trailer 10 is shown. Trailer 10 is a horse trailer with various inner compartments for horses and equipment. It is to be appreciated that other animals could be transported in trailer 10 besides horses. Trailer 10 includes a body 12 and a trailer tongue 14 for connection to a hitch of a towing vehicle. Alternatively, trailer 10 can be configured as a fifth wheel trailer. Trailer body 12 includes a plurality of wheels 16, a floor 18, a first side wall 20, and a second opposite side wall 22.

In order to form the accessible inner compartments, a movable divider 24 is mounted within trailer body 12. Divider 24 has a panel configuration and includes a hinged end 26a, and a free end 26b which pivots in the direction of arrow A. Connecting hinged end 26a of divider 24 to side wall 20 is a hinge 30. Connecting free end 26b of divider 24 to side wall 22 is a slam latch 34 which engages a receiver post 36 of side wall 22.

Slam latch 34 automatically latches divider 24 into the closed position shown in FIG. 1 when divider 24 is moved from the open position toward the closed position. Slam latch 34 includes a spring loaded member which operates to latch divider 24 in the closed position. The open position is shown in phantom in FIG. 1. In the closed position, divider 24 forms a first compartment 38 separate from a second compartment 40. By manually operating slam latch 34, divider 24 can be opened to permit access to compartment 38, such as to remove a horse from trailer 10 after transport. Divider 24 is an angled divider relative to the longitudinal direction of trailer 10. Other angles are possible, including either steeper or shallower angles, and even perpendicular angles. It is to be appreciated that trailer 10 can include any number of dividers 24 as desired. In the example shown, trailer 10 is 6 feet wide and 12 feet long, and divider 24 is 89¾ inches long and 41¼ inches high.

Referring now to FIGS. 2–5, slam latch 34 is shown in greater detail. Slam latch 34 includes a reciprocally mounted slide 42 which is received by a housing 44 forming a part of divider 24. Springs 46, 48 bias slide 42 toward an extended position. Springs 46, 48 are preferably metal coil springs, however, other springs are possible. A single spring is also possible.

Figure 2:
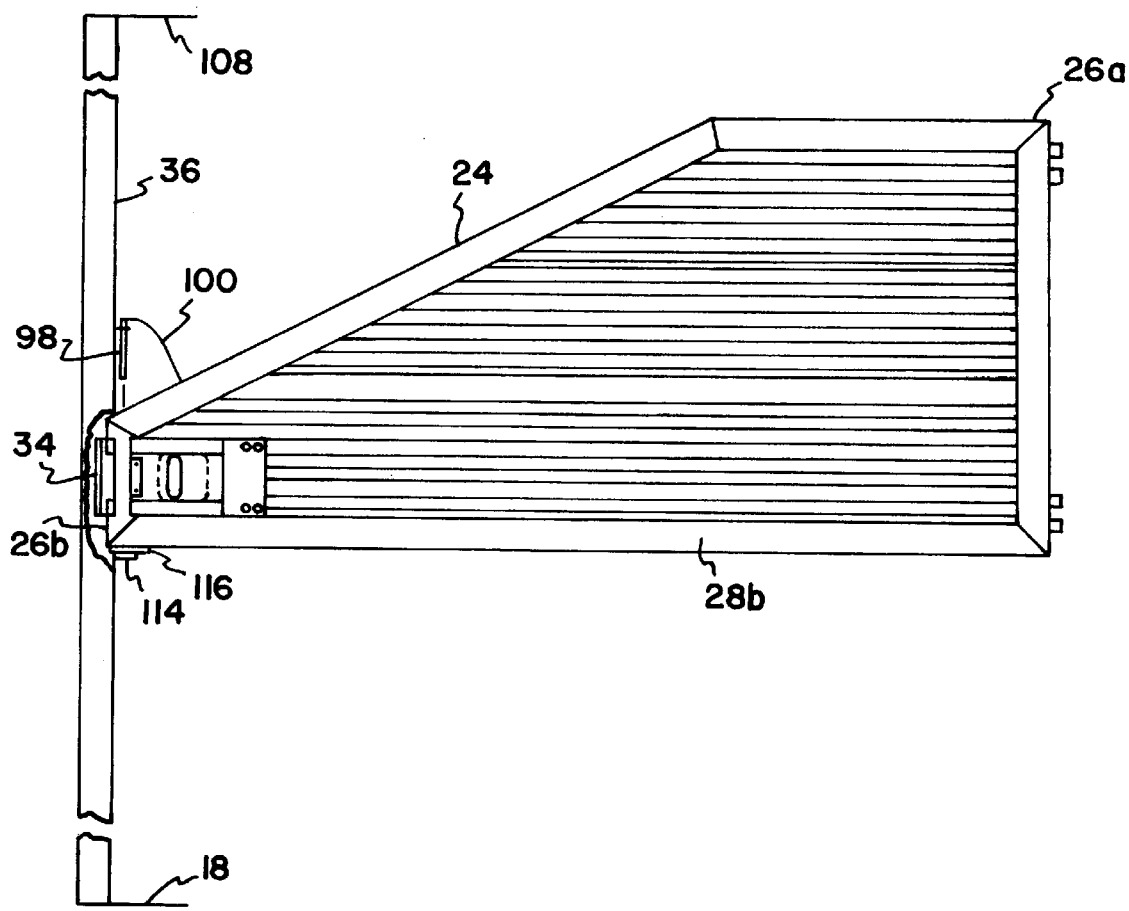
FIG. 2 is an enlarged side view of the divider, slam latch, and receiver post of the horse trailer of FIG. 1, with portions of the receiver post removed for illustration purposes.

The extended position of slide 42 shown in FIGS. 2–4 latches divider 24 into the closed position. Springs 46, 48 allow manual operation of slam latch 34 so as to move slide 42 further into housing 44 (arrow B, FIG. 3) toward a retracted position which permits opening slam latch 34 to move divider 24 away from the closed position. Also, springs 46, 48 allow for automatic latching when divider 24 is moved from the open position to the closed position. As shown in FIG. 2, divider 24 has a slanted upper section on one-half of the divider. Rectangular dividers are also possible.

Slide 42 is a planar member preferably made from a lubricous material, such as plastic. High density polyethylene is one example material. Slide 42 generally has a rectangular cross-section in the longitudinal direction of movement of slide 42. Slide 42 includes a protruding end 50 with an angled surface 52 for engaging wall 22. An opening 54 through slide 42 defines a hand slot or handle. Hand slot 54 is sized large enough to fit an average adult's gloved hand. In one example construction, slide 42 is ⅝ inches thick, 7⅛ inches wide, and 11⅞ inches long. Hand slot is preferably an oval shape 4½ inches long and 2 inches wide. Extending from a back end 56 of slide 42 are two locator pins 58, 60, preferably made from metal. Locator pins 58, 60 are alignment pins for springs 46, 48.

The preferred housing 44 is a metal construction including a slide bracket 62 which receives slide 42. Slide bracket 62 includes a rectangular inner cross-section defining a chamber for receipt of slide 42. Slide bracket 62 includes a front plate 64, top and bottom plates 66, 68, and back lips 70, 72. Front plate 64 includes an access hole 74 which permits access to an interior of housing 44 from front surface 28a of divider 24. The spaced apart back lips 70, 72 provide a back access to an interior of housing 44 from back surface 28b of divider 24. The construction of housing 44 with the two access openings or holes allows access to hand slot 54 of slide 42 from either side of divider 24. This allows a horse attendant on either side of divider 24 to operate slam latch 34. Slide bracket 62 also defines a chamber for receipt of springs 46, 48. Slide bracket 62 has a continuous cross-section except for the various holes and openings formed therein. Slide bracket 62 is also a continuous U-shaped piece from back lip 70, top plate 66, front plate 64, bottom plate 68, and back lip 72.

Figure 5:
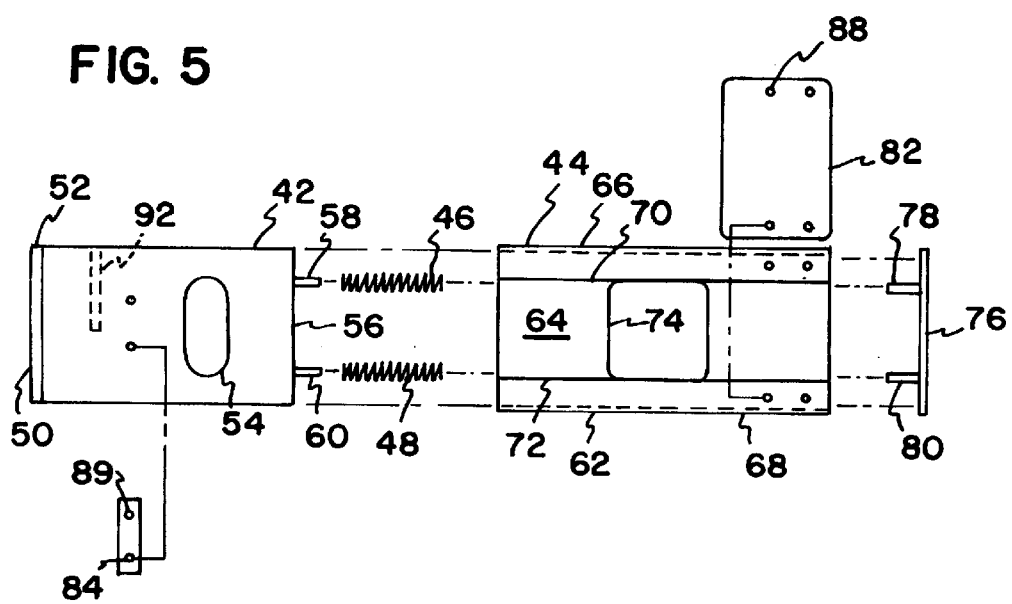
FIG. 5 is an exploded side view of the slam latch of FIG. 2.

Housing 44 includes an end plate 76 mounted to an end of slide bracket 62, such as by welding. End plate 76 includes two locator pins 78, 80 for locating springs 46, 48 during use. Pins 78, 80 are co-axial with pins 58, 60 extending from slide 42. Springs 46, 48 are held in place by the four pins 58, 60, 78, 80, one on each end of springs 46, 48. A cover plate 82 encloses a rear region of slam latch 34 where springs 46, 48 are located. Cover plate 82 is mounted to slide bracket 62 by screws. Four screw holes 88 are shown in FIG. 5. In the example shown, cover plate 82 is made from metal. Slide bracket 62 and end plate 76 are preferably welded to a remainder of divider 24, and all can be made from aluminum including cover plate 82.

Once slide 42 is positioned in an interior of housing 44, a stop member 84 is attached to a rear face 60 of slide 42. Stop member 84 maintains slide 42 within housing 44 such that a maximum extension position is defined. Stop member 84 engages a frame cross member 86 of divider 24 to limit the amount of travel of slide 42. Stop member 84 is preferably screwed onto face 60 of slide 42. Two screw holes 89 are shown in FIG. 5. If it becomes necessary to access an interior of slam latch 34, such as to examine or replace components of slam latch 34, stop member 84 is easily removed and slide 42 is withdrawn from housing 44. In the example shown, stop member 84 is made of metal and has a bar-like construction.

Slam latch 34 is preferably housed within divider 24, as shown in the Figures. However, slam latch 34 can be positioned to one side or the other of divider 24, if desired. It is preferred that slam latch 34 be accessible from both sides of divider 24. However, if access on front surface 28a only is desired, such arrangement is an option. While the inner hand slot 54 construction is preferred, protruding bars or handles can be mounted to one or both sides of slide 42, if desired. In the case of an existing trailer, slam latch 34 can be retrofitted onto the divider from the trailer, and a receiver post 36 can be added to the trailer in the desired location if no receiver recess exists or can be formed in the existing wall in the trailer. While it is preferred that receiver post 36 be flush with wall 22, it is not required, such as in the case of retrofitting existing trailers with slam latches 34.

In one example construction, slide bracket 62 is from extruded aluminum 0.156 inches in wall thickness, 7½ inches wide and 15 inches long (access hole 74 is 4½ inches square); cover plate is aluminum 0.100 inches thick, 7 inches wide, and 4¾ inches long; end plate is aluminum ¼ inches thick, 1 inch wide, and 7½ inches long; locator pins 78, 80 are ⅜ inches aluminum rods, 1¾ inches long; locator pins 58, 60 are 5/16 inches stainless steel roll pins, 2¼ inches long mounted partially within slide 42, and springs 46, 48 are ⅝ inches stainless steel compression springs 4½ inches long.

A safety lock 90 is provided to maintain slam latch 34 in the latched position. Safety lock 90 includes a recess 92 in slide 42, and a hole 94 in a frame top member 96 of divider 24. Safety pin 98 is manually positioned in hole 94 of divider 24 and recess 92 of slide 42 when the two are aligned. In the locked position, it is not possible for slide 42 to move from the extended position to the retracted position. A cable 100 conveniently attaches safety pin 98 to divider 24, such as to prevent loss or misplacement when not in use. Hole 94 and recess 92 are conveniently formed in frame top member 96 and slide 42 such as by drilling.

Referring now to FIG. 4, receiver post 36 is shown in greater detail. Receiver post 36 includes a ramp surface 110 which slidably engages end 50 of slide 42 to move slide 42 from the extended position toward the retracted position to enable automatic latching by merely moving divider 24 from the open position toward the closed position. Once end 50 of slide 42 clears ramp surface 110 and is positioned adjacent to recess 112, springs 46, 48 bias slide 42 toward the extended position, thereby latching divider 24 in the closed position. Once end 50 is positioned in recess 112, divider 24 is latched in the closed position. Only retraction of slide 42 will allow unlatching of divider 24.

Preferably, receiver post 36 is an extruded construction, such as from aluminum, having a continuous cross-section from floor 18 to ceiling 108 of trailer 10. Receiver post 36 can be utilized as a wall support structure within trailer body 12. Preferably, receiver post 36 is flush with side wall 22 as shown in FIGS. 1 and 4. In the example shown, receiver post 36 is 2 inches deep, about 6½ wide, and has a wall thickness of 0.100 inches. The preferred receiver post 36 and slam latch 34 do not provide any protruding structures which could catch on a horse or a person. Also, slam latch 34 does not have any protruding structures which a horse could inadvertently bump into, and then open the latch. Slide 42 positioned in divider 24 requires a horse attendant to reach into hand slot 54 to pull back on slide 42 to remove end 50 from recess 112. Recess 112 is sufficiently deep such that a horse bumping into divider 24 cannot bend divider 24 enough to remove end 50 of slide 42 from access 112. As shown in FIG. 4, recess 112 has an angled orientation the same as slide 42 to mate with the angled orientation of slide 42 for secure latching.

A horizontal support member 114 extends from receiver post 36 for supporting a lower edge of divider 24. This supports divider 24 from bouncing up and down during travel. Preferably, divider 24 includes a pad 116 to protect divider 24 from wear and noise during support by support member 114. Pad 116 can be made from plastic, such as high density polyethylene, and screwed to divider 24.

Referring now to FIG. 6, an alternative receiver post 120 is shown having a recess 122 configured at a different angle, such as for use in an alternative trailer having a wider construction wherein the divider or dividers are positioned at a different angle relative to the longitudinal direction of the trailer. For example, receiver post 36 is for a 6 foot wide trailer, and alternative receiver post 120 is for a 7 foot wide trailer and for an 8 foot long trailer. In the case of a 7 foot trailer, one example divider is 89⅞ inches long. In the case of an 8 foot trailer, an example divider is 99⅞ inches long. Receiver post 120 includes a ramp surface 124 for use in automatic latching of slam latch 34.

To operate slam latch 34, it is only necessary to push divider 24 from the open position toward the closed position with sufficient force such that ramp surface 110 engages slide 42 enough to move slide 42 toward the retracted position until end 50 clears ramp surface 110 and is adjacent to recess 112. At that point, springs 46, 48 move slide 42 to the extended position, thereby latching divider 24 closed.

To open divider 24, a horse attendant standing on either side of divider 24 places a hand in hand slot 54 and pulls slide 42 away from receiver post 36 and against springs 46, 48 until end 50 is clear of recess 112. Divider 24 can then be pivoted from the closed position to an open position. If safety lock 90 is locked, pin 98 is first removed from recess 92 of slide 42 and hole 94.

By constructing slam latch 34 from a combination plastic and metal construction, a durable, reliable and low maintenance latch is provided. Wearing of parts is minimized since there is no sliding of metal parts on metal parts. No additional lubrication is needed, either. The preferred high density polyethylene construction of slide 42 slides well against the preferred aluminum construction of housing 44.

Further, it is to be understood that even though numerous characteristics and advantages of the invention have been set forth in the foregoing description, together with details of the structure and function of the invention, the disclosure is illustrative only and changes may be made in detail, and especially in the matters of shape, size and arrangement of parts, wherein the principles of the invention to the full extent indicated by the broad general meaning of the terms in which the appended claims are expressed.

What is claimed is:

1. A slam latch comprising:
   a housing with a front and a back defining an interior therebetween, the front and the back each having an access hole which allows access to the interior;
   a planar slide received in the interior of the housing, the slide movable between an extended position and a retracted position, the planar slide defining a hole through the slide which forms a handle, the handle accessible through both of the access holes of the housing; and
   a spring engaged with the housing and the slide to bias the slide toward the extended position.

2. The slam latch of claim 1, wherein the housing includes a divider defining a generally planar panel having a front surface and an opposed back surface, and a hinged end and an opposed free end, the planar slide positioned at the free end.

3. The slam latch of claim 2, further comprising:
   a trailer body; and
   a hinge mounting the hinged end of the divider to the trailer body.

4. The slam latch of claim 3, wherein the trailer body includes a slide receiver defining a ramp surface and a recessed region for receiving an end of the planar slide.

5. The slam latch of claim 4, wherein the trailer body has a floor, a ceiling, and a side wall connecting the floor to the ceiling, and wherein the receiver has an extruded construction defining a continuous cross-section extending from the floor to the ceiling, and wherein the receiver is positioned flush with the side wall.

6. The slam latch of claim 5, wherein the divider has a lower surface, further comprising a support surface mounted to the receiver engageable with the lower surface of the divider.

7. The slam latch of claim 6, further comprising a non-metallic pad positioned between the divider and the support surface of the receiver.

8. The slam latch of claim 1, further comprising a stop member mounted to the planar slide and positioned to engage the housing, wherein the planar slide is prevented from being removed from the interior of the housing.

9. The slam latch of claim 1, wherein the housing includes a front plate which forms the front of the housing, and two spaced elongated back lips which form the back of the housing, the housing further including an end plate and a cover plate, the cover plate mounted to the back lips, the end plate mounted to the front plate and positioned to form an enclosed chamber between the planar slide, the front plate, the back lips, and the cover plate, the spring positioned in the enclosed chamber.

10. The slam latch of claim 9, further comprising a first spring locator pin extending from the end plate, and a second spring locator pin extending from the planar slide, the spring having a coiled construction and positioned to surround the first and second locator pins.

11. The slam latch of claim 1, further comprising a safety lock operable between first and second positions, the first position locking the planar slide from movement from the extended position toward the retracted position, the second position permitting movement of the planar slide from the extended position toward the retracted position.

12. The slam latch of claim 1, wherein the housing has a metallic construction, and the planar slide has a plastic construction.

13. A divider for a horse trailer comprising:
   a generally planar metal panel defining a front surface, an opposite facing back surface, a hinged end and an opposed free end, the free end defining an inner chamber having a rectangular cross-section between the front and back surfaces, and a hole through the panel from the front surface to the back surface allowing access to the chamber from both the front surface and the back surface;
   a slam latch located at the free end, the slam latch including a planar plastic slide having one end received in the chamber and an opposite end extending from the chamber, the slide having a rectangular cross-section, the slide defining a hole through the slide positioned in the access hole, the slide movable between an extended position and a retracted position;
   a spring positioned in the chamber to bias the slide toward the extended position; and
   a safety lock having two positions, a first position locking the slide in the extended position, and a second position permitting movement of the slide from the extended position toward the retracted position.

14. The divider of claim 13, further comprising a stop member extending from the slide and positioned in the hole through the panel, the stop member engageable with the panel to prevent removal of the slide from the chamber.

15. The divider of claim 13, wherein the panel defines a second hole, and the slide defines a recess, wherein the safety lock includes a pin which is received by the second hole in the panel and the recess of the slide when the second hole is in alignment with the recess.

16. A horse trailer comprising:
   a trailer body defining first and second opposed side walls, the trailer body including a floor and a ceiling connected to the first and second side walls;
   a divider hingedly mounted to the first side wall between open and closed positions, the divider including a lower edge;
   a slam latch positioned on the divider to mount the divider to the second side wall, the slam latch including a slidable member slidably received within the divider between an extended position and a retracted position, the slam latch including a spring biasing the slidable member toward the extended position, the slidable member including an end projecting from the divider when the slidable member is in the extended position;
   a receiver post mounted to the second side wall and having a continuous cross-section from the floor to the ceiling, the receiver post positioned flush relative to the second side wall, the receiver post defining a ramp surface and a recessed region for receiving the end of the slidable member; and
   a support surface mounted to the receiver post and supporting the lower edge of the divider in the closed position.

17. The horse trailer of claim 16, wherein the recessed region of the receiver post is at a non-perpendicular angle relative to the second wall.

* * * * *